United States Patent Office 3,361,916
Patented Jan. 2, 1968

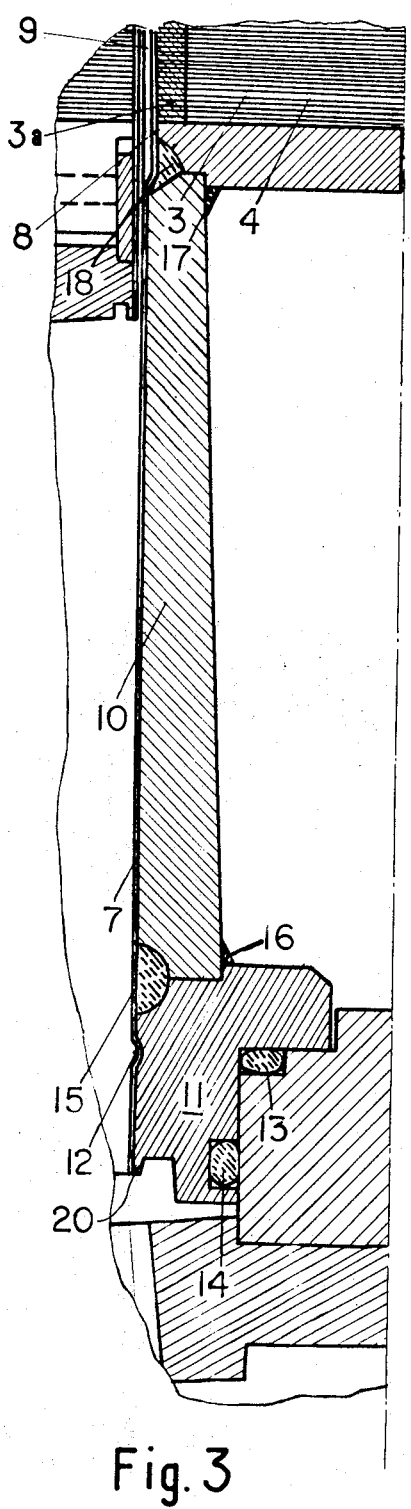
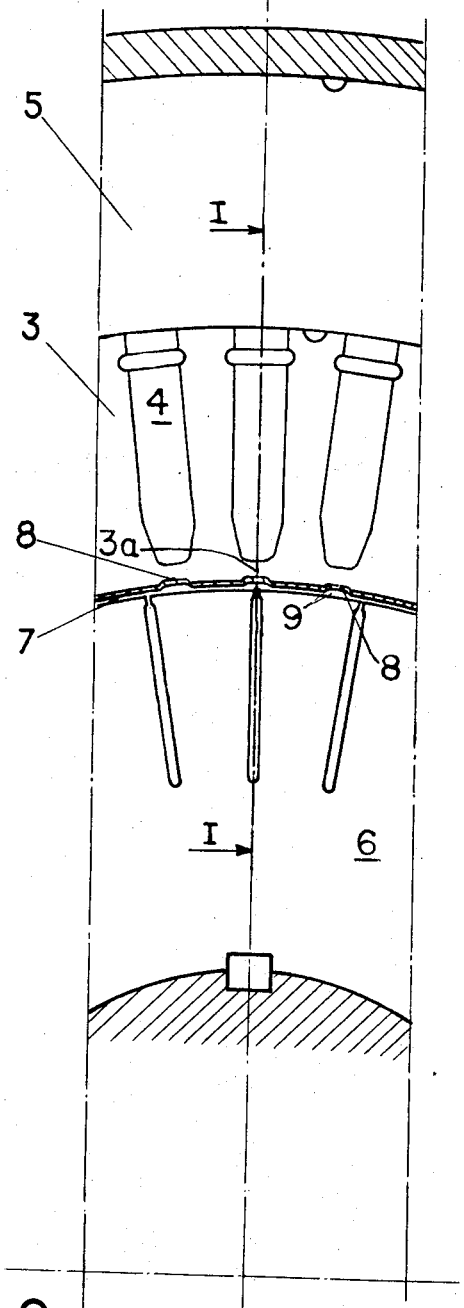
Fig. 3
Fig. 2

3,361,916
WATERTIGHT ELECTRIC MOTORS
Paul André Guinard, Saint-Cloud, France, assignor to Society Etablissements Pompes Guinard, Saint-Cloud, France, a corporation of France
Filed Jan. 26, 1965, Ser. No. 428,043
Claims priority, application France, Feb. 6, 1964, 962,848
2 Claims. (Cl. 310—86)

The present invention relates to an improvement in watertight electric motors and particularly to an embodiment of the stator in a such motor to effectively prevent any liquid from penetrating the notches which contain the winding, in particular when this motor forms a part of an immersed electro-pump group.

Motors of this kind are already known in which the notches of the stator, instead of opening at the inner surface of the stator, as in the standard motors, are provided in the outer surface of the laminated stator and are closed either by the housing of the motor, or by a laminated sleeve, while the inner surface of the stator has received a protective lining consisting of an impregnated cardboard or of an insulating coating.

Liquid-tight motors are also known which comprise notches opening at the inner surface of the stator and in which a metallic sheltering jacket is anchored. Nevertheless, this arrangement is not absolutely safe, as, in the case of a short-circuit or an excessive heating of the winding, an overpressure is generated in the notches due to the gases given off by the insulating materials and this overpressure may damage the inner jacket anchored in the notches. In addition, this anchorage obtained by embossing the jacket in the deep inner notches of the stator can result, when embossing, in cracking and in any case weakening of the metal of the jacket.

The motor according to the invention meets all these drawbacks and is characterized in that it comprises a laminated stator which is provided, in combination, with outer notches containing the winding and closed by a laminated sleeve and, on its inner surface, notches having a small depth in which a sheltering jacket is anchored by embossing.

In a particularly suitable form of embodiment, the sheets forming the laminated stator are so disposed that, after mounting, the shallow inner notches constitute longitudinal grooves for the anchoring of the jacket which is, in addition, anchored by embossing in annular grooves preferably provided in the lateral flanges or clamping members of the stator.

Other objects and advantages of the invention will appear from the following specification made with reference to the accompanying drawing, given only by way of example, wherein:

FIGURE 2 is a partial cross-section, on a greater scale, along line II—II in FIGURE 1.

FIGURE 3 illustrates, on a greater scale, the zone enclosed in the dot and dashes oval line in FIGURE 1.

Figure 1:
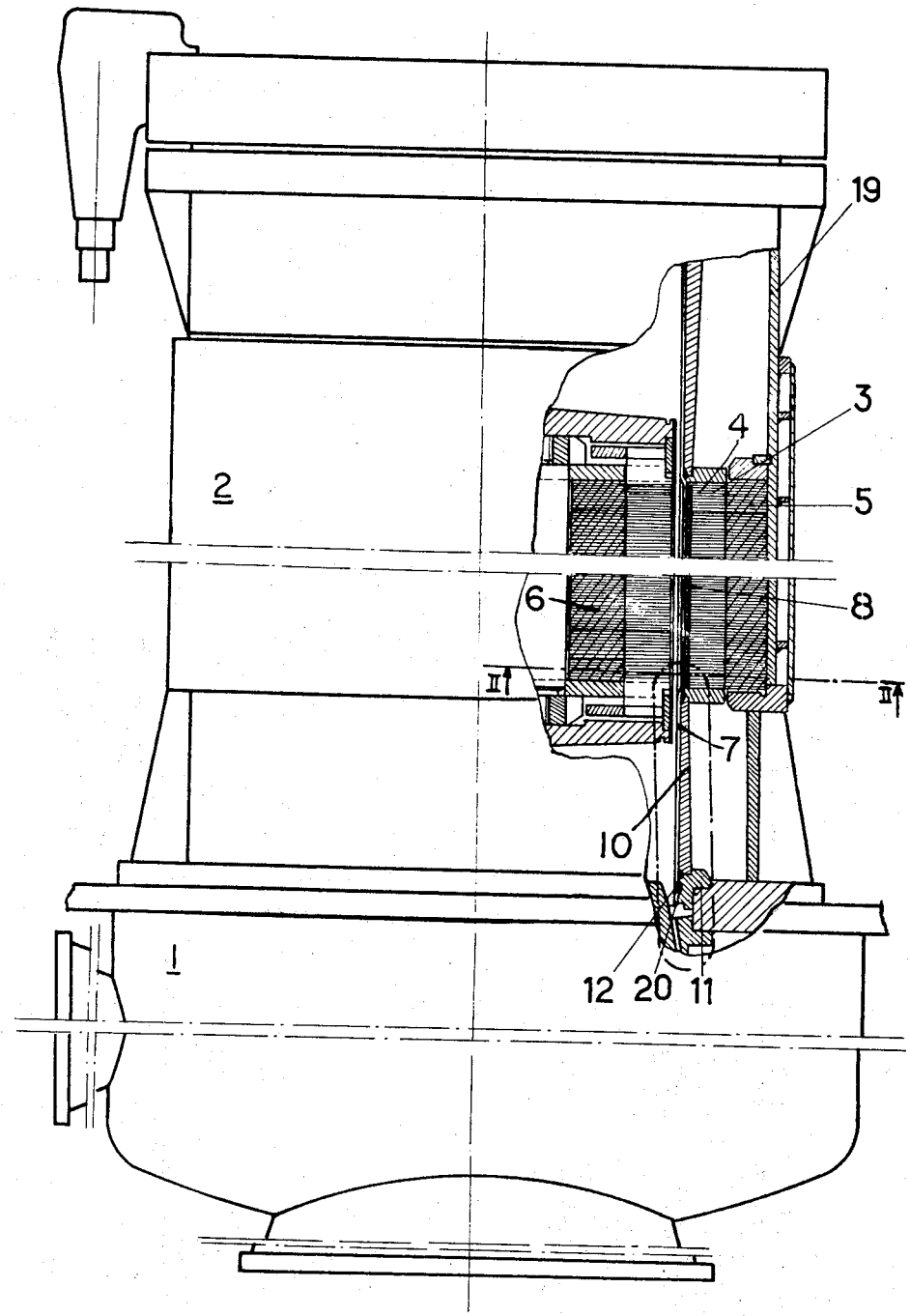
FIGURE 1 is a general elevation view on a small scale, of an electro-pump group in one piece, provided with an improved motor according to the invention, with a partial section along line I—I in FIGURE 2.

The electro-pump, illustrated only by way of example, comprises a pump 1 and an electric motor 2 improved according to the invention. This motor belongs to the type having a stator provided with an inner jacket and a dry winding. The stator is formed by a pack of sheets 3 having outer notches 4 and by a laminated stator sleeve 5 capping the pack of sheets 3 after the winding has been introduced in notches 4. The rotor of the motor is indicated in 6.

A jacket 7 is interposed between the stator and the rotor, but, according to the invention, this jacket is tightly anchored inside the sheets 3 of the stator. With this object, these sheets 3 are internally provided with shallow notches 8 forming, when the sheets 3 are fitted together, longitudinal grooves in which the corresponding wall of the jacket 7 is embossed in 9, as shown on a greater scale in FIGURES 2 and 3. In addition, the jacket 7 is anchored in circular grooves 12 provided in the lateral flanges or clamping members 10 or 11 of the stator. The tightness of said flanges, at their ends, is ensured by joints 13 and 14.

The above described form of embodiment yields particularly advantageous results, the most important of which are indicated hereafter:

(1) The water tightness of the winding is secured in two different ways, on the one hand by means of the jacket 7 and on the other hand by the thickness 3a of the metal forming the bottom of the notches 4 of the sheets of the stator: this protection is completed inside the stator by the clamping members 10 and 11. Inversely the jacket 7 is protected by the sheets 3 and the clamping members 10 and 11, and this jacket 7 cannot be crushed from outside towards inside, in the case of an overpressure accidentally generated in the winding notches.

(2) The jacket 7, anchored as above described, offers a very great rigidity and thereby eliminates the magnetic vibrations which appeared during operation when the jacket was not anchored, said vibrations often bringing about the breaking of the jacket.

(3) The general arrangement selected for the above described form of embodiment, facilitates the mounting and the removing of the stator as it is not necessary to destroy the various weldings which appear particularly in FIGURE 3 in 15, 16, 17, 18 and in 20 at the ends of the jacket 7. The whole stator can be extracted from the housing 19 and rewound without removing the jacket 7.

(4) Another advantageous result appears in special applications, particularly for the electro-pump groups working with demineralized water or with heavy water. In these applications, the outer housing 19 of the motor containing the laminated sleeve of the stator forms a block independent of all the elements which are in contact with the pumped water and, accordingly, this housing can be made of common steel instead of stainless steel.

(5) Obviously the described and illustrated form of embodiment has been given only by way of example and all modifications or alternatives which do not change the main features of the invention as claimed hereafter may be performed without departing from the scope of the present invention.

What is claimed is:

1. In a watertight electric motor comprising a housing, a laminated stator arranged in said housing and provided with a winding, a rotor and tubular means fitted to the inner surface of the stator for tightly separating the rotor from the stator, said stator comprising in combination notches provided on its outer surface to contain the winding, a laminated sleeve arranged between the outer surface of the stator and the housing to close said notches, shallow notches provided on the inner surface of said stator and a tubular jacket anchored in said shallow notches.

2. In a watertight electric motor according to claim 1 wherein the shallow notches provided on the inner surface of the stator define longitudinal grooves, and lateral clamping means are provided for positioning the laminated stator, said means being provided with shallow circular grooves for anchoring the inner tubular jacket.

References Cited

UNITED STATES PATENTS

| | | | |
|---|---|---|---|
| 3,143,676 | 8/1964 | Niemkiewicz | 310—86 |
| 3,188,505 | 6/1965 | Wiley | 310—86 |

MILTON O. HIRSHFIELD, *Primary Examiner.*

L. L. SMITH, *Assistant Examiner.*